United States Patent [19]

Louis

[11] 4,142,881

[45] Mar. 6, 1979

[54] PROCESS FOR WELDING GLASS SO THAT METALLIC ELEMENTS PASS THROUGH THE WELD BEAD

[76] Inventor: Raymond M. R. G. Louis, 66, Avenue de Paris, 78000 Versailles (Yvelines), France

[21] Appl. No.: 810,514

[22] Filed: Jun. 27, 1977

[51] Int. Cl.² .................. C03B 23/20; C03B 9/00; C03C 27/02

[52] U.S. Cl. ........................... 65/40; 65/52; 65/59 R; 65/59 A; 65/59 B; 65/DIG. 4; 65/DIG. 11

[58] Field of Search ............. 65/DIG. 4, 59 A, 59 R, 65/59 B, DIG. 11, 40, 55, 59

[56] References Cited

U.S. PATENT DOCUMENTS

| | | | |
|---|---|---|---|
| 2,074,864 | 3/1937 | Salzberg | 65/59 A X |
| 2,386,820 | 10/1945 | Spencer | 65/DIG. 4 |
| 2,504,303 | 4/1950 | Clark et al. | 65/59 B X |
| 3,519,409 | 7/1970 | Stutzman | 65/59 A X |
| 3,543,383 | 12/1970 | Freeman et al. | 65/59 A X |

Primary Examiner—S. Leon Bashore
Assistant Examiner—Frank W. Miga
Attorney, Agent, or Firm—Cushman, Darby & Cushman

[57] ABSTRACT

A process for welding two glass members together to form a weld bead through which connecting wires extend. The glass members are first brought into intimate contact with metal parts which can be heated by a high frequency current. The glass members are held close to one another with the wires disposed in the space between them, and the glass is then melted until it welds by heating the metal parts with the aid of high-frequency heating coil windings surrounding the metal parts.

6 Claims, 1 Drawing Figure

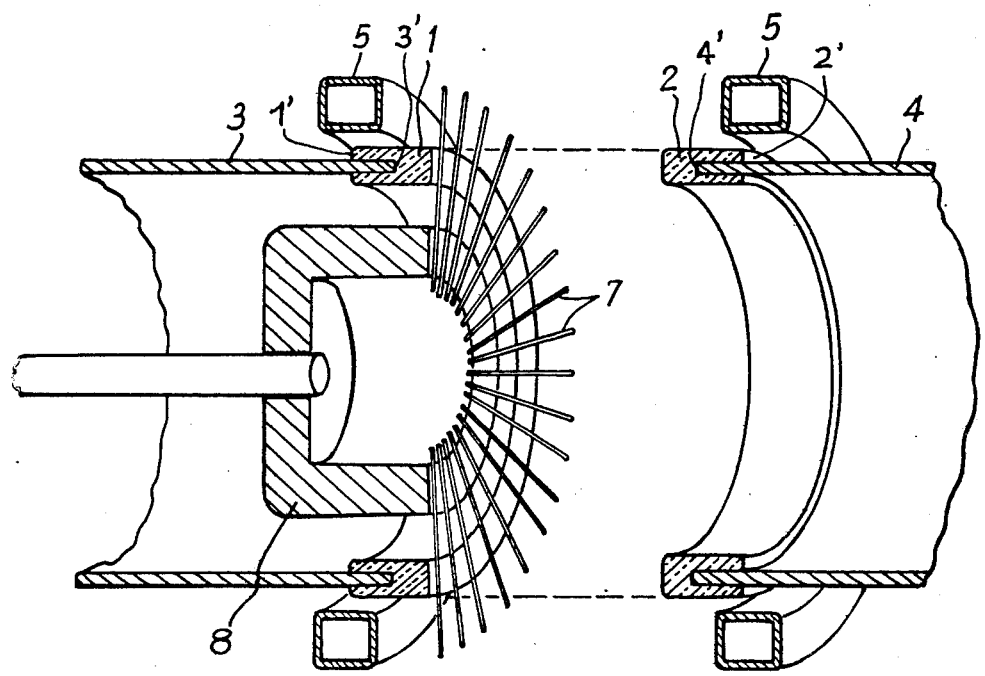

PROCESS FOR WELDING GLASS SO THAT METALLIC ELEMENTS PASS THROUGH THE WELD BEAD

BACKGROUND OF THE INVENTION

The present invention relates to a process for the welding of glass to glass, or in other words for the welding of one glass member to another glass member, so that spaced metallic elements extending from one side to the other of the glass members pass through the weld bead.

The invention also relates to any article comprising two glass members joined together by a weld bead through which metallic elements pass and which is made by the process of the invention.

DISCUSSION OF THE PRIOR ART

It is known that in the electrical fields apparatus are used through whose walls one, and often more than one, electrode passes. A typical example is that of special tubes for infrared vision or photography. A single tube contains a sensitive mosaic composed, for example, of fifty individual juxtaposed photoelectric cells. Each of these cells is provided with two connecting wires. There are therefore fifty pairs of wires passing through the wall of the tube. In known tubes of this kind the connections of the cells have hitherto been made by means of wires which pass through a glass wall to which they have been welded with the aid of a flame. It is clear that this method requires considerable precautions because the connecting wires are thin and may be melted by excessive heat produced by the flame. A considerable area of the glass is subjected to the heat from the flame. One known solution is to dispose the connecting wires not directly in the direction transverse to the wall, but in the longitudinal direction between two concentric walls, in order that one of these walls may at least partially protect the wires from the flame.

SUMMARY OF THE INVENTION

The main aim of the invention is to provide a process for the welding of glass by making a weld bead of glass through which metallic elements such as wires, filaments, or tubes, pass, the welding being effected with moderate heating of the glass which does not melt these wires, filaments, or tubes.

According to the invention, to weld together two glass members so that interposed metallic elements pass through the weld bead, the metallic elements are held in place between the two glass members in the welding zone and the glass is heated indirectly through metal parts brought into intimate contact with the glass members in proximity to the welding zone, these metal parts being heated by way of at least one coil winding which surrounds these metal parts and through which a high-frequency current passes.

BRIEF DESCRIPTION OF THE DRAWING

An embodiment of the present invention will hereinafter be described, by way of example, with reference to the accompanying drawing, in which the FIGURE shows a longitudinal section through two pieces of glass having metal elements which are to pass through a weld bead in the transverse direction in relation to the walls.

DESCRIPTION OF A PREFERRED EMBODIMENT

The single FIGURE shows two glass rings 1 and 2 respectively which are to be welded together without direct heating by means of a flame. The glass rings 1 and 2 are first brought into intimate contact with the end of a respective metal tube 3, 4. The two metal tubes 3 and 4 are of a metal compatible with the glass. The intimate contact between each glass ring 1, 2 and the respective metal tube 3, 4 can be achieved in two different ways, either the end faces 3' and 4' of the tubes 3 and 4 can be pressed against the corresponding end faces 1' and 2' of the rings 1 and 2, or each glass ring 1 and 2 can be welded onto the end portion of the respective metal tube 3, 4, as is illustrated in the FIGURE. This welding operation is effected in a well known way which is not further described herein. When this work is completed, each metal tube 3, 4 has an end portion completely engaged in the corresponding ring 1, 2. The tube 3, 4 penetrates longitudinally into the glass ring 1, 2 over about half the length of the latter.

In the FIGURE the rings 1 and 2 are shown to have equal or only slightly different diameters, and they are shown axially aligned with one another. In the FIGURE, the spacing between the rings 1 and 2 is exaggerated in order to clearly show that a large number of individual, spaced, radially extending rods 7 are disposed in the joint plane between the adjacent end faces of the glass rings 1 and 2. Before the welding operation is effected these rods 7 are clamped between two jaws 8 (only one of which is shown in the FIGURE for the sake of clarity) so that the rods 7 are held by the jaws 8 in the illustrated position.

Each jaws 8 extends longitudinally within a respective metal tube 3, 4 and a respective glass ring 1, 2. The jaws 8 are pushed against one another in the axial direction. The jaws 8 may be made of ceramic material, quartz, rubber, or any other insulating material, or may be made of metal if the rods 7 are of small diameter. The jaws 8 have a large diameter compared to the diameter of the rods 7. One or both of the jaws 8 may have a series of radially extending grooves in its end face to receive the rods 7 and ensure that the rods 7 are correctly spaced. For example, if the glass rings 1, 2 each have an internal diameter of about 36 mm it is possible to dispose 100 spaced radial rods 7 in the joint between the two rings. In this case the rods 7 should have an external diameter of the order of 0.5 to 0.6 mm in order to ensure that each rod is separated from the adjacent rod by a distance substantially equal to the external diameter of the rods. The rods 7 are made of a metal which is compatible with the glass and is also a conductor of electricity.

In the process illustrated in the FIGURE the two glass rings 1 and 2 are to be welded by way of two high-frequency heating coil windings 5, one winding being disposed on each side of the joint plane. This ensures that the joint plane is free of all obstructions and that there is the necessary space for the rods 7.

When each high-frequency heating coil winding 5, which is disposed externally around a respective metal tube 3, 4, is energized the tubes 3, 4 are heated by induced current, and the tubes in turn heat the glass rings by conduction.

To perform the welding operation the two glass rings 1, 2 are pressed axially towards one another against the arrangement of radial rods 7 and current is fed to the high-frequency heating coil windings 5. The glass of the rings 1, 2 is heated by the metal tubes 3, 4 and is locally melted. The molten glass flows around the rods 7 whereby the glass is welded to the rods 7 and the glass rings are welded directly together in the intervening spaces between the rods 7. A weld bead is therefore formed.

In this way it may be said that the glass is in a sense heated internally in a highly localized manner, at or very near the actual location of the zones to be welded. The volume of glass brought to melting temperature is slightly greater than that actually necessary for making the weld. Consequently there is no great difficulty in preventing any uncontrolled flow of molten glass. It will be seen that the invention makes it possible for the welding of glass to glass to be effected by personnel who are not highly trained, and the process described may be effected automatically with a high throughput. The only requirement that must be met is that the pressure applied should be chosen to ensure that the weld is made without the glass being excessively upset and without an excessive weld bead being formed.

It will be noted that the windings 5 do not apply any heating action to the rods 7, as the rods 7 are rectilinear and do not form loops, and as their section is too small for any substantial induced current to occur. These rods 7 will only be heated by the glass, and, as already stated, as the heating of the glass is strictly limited and is effected "internally" the two glass rings 1, 2 can be welded without damaging the rods 7. The rods 7 are then held firmly and hermetically by the glass. It will readily be understood that the conventional method of welding glass by heating with the aid of a flame does not enable this result to be achieved, because the rods 7 would be damaged by the flame; in particular, they could be partially or completely melted by the flame. It is even possible with the process of the invention for the rods 7, or some of them, to be hollow and after the glass has been welded to be used as suction or insufflation tubes passing through the glass.

The hundred rods 7 constitute fifty pairs of electric conductors which may be used to connect fifty photoelectric cells inside a perfectly fluid-tight casing comprised of the glass rings 1, 2. These photoelectric cells, each of which has an area of one square millimeter, make up a sensitive mosaic such as is found, for example, in special tubes for infrared vision or photography. Up to the present time the connections of the sensitive cells of the mosaic in tubes of this kind have been made by wires disposed longitudinally between two tubes partially engaged one in the other and welded to one another by their end portions with the aid of a flame. In this example the process of the invention provides a considerable improvement. The radial arrangement of the conductors 7 considerably reduces the size of the completed device, whilst manufacturing defects are practically eliminated and in addition the use of highly skilled labour for the welding work is no longer obligatory.

DESCRIPTION OF A SPECIFIC EXAMPLE

A weld was made as shown in the FIGURE between two glass rings 1, 2 each having an external diameter of 40 mm and a wall thickness of 2 mm. Each metal tube 3, 4 was of KOVAR metal and has a wall thickness of 0.5 mm. Each winding 5 was a closed loop extending over about 360°, made of copper, and having an internal diameter of 44 mm. Each winding 5 was hollow and a flow of cooling water was maintained through it.

The high-frequency generator used supplied an industrial high frequency of 1 megacycle; it had a power of 2 kW.

Each winding 5 should surround the pieces of glass as closely as possible. In this respect the localized swelling produced by the welding operation must be taken into account.

In the drawing the spacing of the parts is exaggerated for the sake of clarity. In practice the windings 5 must be very close and must also be brought as near as possible to the glass rings 1, 2; moreover, they should extend over the end portion of the metal tubes 3, 4 embedded in the glass rings 1, 2. It will be observed that in the example described a single winding 5 could be used if it were given a suitable profile enabling it to surround and straddle the metal elements 7, thereupon coming close to the glass rings 1, 2 and extending just over the end portions of the metal tubes 3, 4 embedded in these rings.

It has been explained above in connection with the embodiment shown in the FIGURE that the glass rings 1 and 2 can be brought into intimate contact with the end of two metal tubes 3, 4 in two different ways, either by a welding operation as illustrated in the FIGURE, or by simply pressing the end faces against one another. In this second case the metal elements 7 are clamped between the rings 1 and 2 and the tubes 3, 4 are clamped against the rings 1 and 2. The welding operation is then commenced and through the effect of the heating the tubes 3 and 4 start to penetrate into the glass rings 1 and 2, and the same relative arrangement of the metal tubes 3, 4 and glass rings 1, 2 as in the FIGURE is then obtained.

It may be difficult to cause the metal tubes 3, 4 and the glass rings 1, 2 to bear against one another when they are disposed with their axes situated horizontally; in this case it may be preferable to dispose them with their axes disposed vertically, at least until the metal tubes 3, 4 start to penetrate into the glass rings 1, 2. After the glass has been sufficiently softened, the whole arrangement can be pivoted so as to bring the axes into a horizontal position and thus enable the glass rings to be turned during the welding.

The present invention is not confined to the welding of glass rings but may be used to weld any two pieces of glass together so that metal elements pass through the weld bead in any direction. It will be seen that any article has been made by the process of the invention if the two pieces of glass between which the metal elements are situated each have, spaced from the metal elements, an end portion engaged with a metal part which can be heated by a high-frequency induced current. As can be seen from the FIGURE, the metal parts 3, 4 generally extend out of the pieces of glass, of which they form extensions. However, it is clear that when the weld bead has been made in the manner explained it is possible to cut off the metal parts 3, 4 at the point where they pass out of the pieces of glass 1, 2, so that in finished article only the end portions of the metal parts 3, 4 engaged inside the glass pieces 1, 2 would be seen.

I claim:

1. A process for welding together two glass members so that metallic elements pass through the weld bead formed in a welding zone, comprising the steps of bringing each glass member into intimate contact with a respective metal part in proximity to the welding zone, holding metallic elements between the two glass members in the welding zone and heating the metal parts near the welding zone by way of at least one high-frequency heating coil winding and thereby heating the welding glass members indirectly to weld the glass members to thereby form a weld bead through which the metallic elements extend.

2. A process according to claim 1, wherein the metal parts are brought into intimate contact with the glass members by pressing the end faces of the metal parts against corresponding end faces of the glass members, the heating step having the effect of causing the end portion of each metal part first to penetrate to the interior of the glass member.

3. A process according to claim 1, wherein metal parts are brought into intimate contact with the glass members by previously welding each glass member to an end portion of a respective metal part, each end portion penetrating into the interior of the corresponding glass member.

4. A process according to claim 1, wherein the glass members each have an end portion, the end portions having substantially equal diameters, said end portions being brought into alignment with one another, and wherein the metallic elements are held between the end faces of the glass members in a direction transverse with respect to said end portions and to the metallic parts in contact with the glass members, the heating being effected by way of two high-frequency heating coil windings disposed one on each side of the metallic elements.

5. A process for welding together two glass rings so that metallic elements pass through the weld bead formed, comprising the steps of welding each glass ring to an end portion of a respective metal tube, axially aligning the two glass rings, holding a plurality of metallic elements between the two glass rings in the welding zone, and heating the metal tubes by a high-frequency heating coil to indirectly heat the glass rings thereby form a weld bead between the two glass rings through which the metallic elements extend.

6. A process according to claim 5, wherein the metallic elements are a plurality of metal rods which are held between the two glass rings to extend substantially radially with respect thereto.

* * * * *